(12) United States Patent
Lee et al.

(10) Patent No.: US 10,946,721 B2
(45) Date of Patent: Mar. 16, 2021

(54) VEHICULAR HEAT MANAGEMENT SYSTEM

(71) Applicant: Hanon Systems, Daejeon (KR)

(72) Inventors: Jae Min Lee, Daejeon (KR); Young Chul Kim, Daejeon (KR); In Hyeok Kim, Daejeon (KR); Seo Jun Yoon, Daejeon (KR); Kyeong Cheol Lee, Daejeon (KR); Seung Ho Lee, Daejeon (KR); Sung Ho Kang, Daejeon (KR); Jung Jae Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 104 days.

(21) Appl. No.: 16/536,959

(22) Filed: Aug. 9, 2019

(65) Prior Publication Data
US 2020/0047589 A1    Feb. 13, 2020

(30) Foreign Application Priority Data

Aug. 10, 2018  (KR) .................. 10-2018-0093484
Aug. 10, 2018  (KR) .................. 10-2018-0093488

(51) Int. Cl.
*B60H 1/00* (2006.01)
*B60H 1/03* (2006.01)
(Continued)

(52) U.S. Cl.
CPC ............ *B60H 1/03* (2013.01); *B60H 1/004* (2013.01); *B60H 1/00028* (2013.01);
(Continued)

(58) Field of Classification Search
CPC .. B60H 1/03; B60H 1/00028; B60H 1/00328; B60H 1/004; B60H 1/00485;
(Continued)

(56) References Cited

U.S. PATENT DOCUMENTS

| 2010/0281901 A1* | 11/2010 | Kawase | ............... F25B 25/005 |
| | | | 62/238.7 |
| 2012/0043390 A1* | 2/2012 | Noh | ......................... F24D 3/08 |
| | | | 237/2 A |

(Continued)

*Primary Examiner* — Davis D Hwu
(74) *Attorney, Agent, or Firm* — Norton Rose Fulbright US LLP; James R. Crawford

(57) ABSTRACT

Vehicular heat management system includes a refrigerant circulation line including a compressor, a high pressure side indoor heat exchanger, a heat pump mode expansion valve, an outdoor heat exchanger, an air conditioning mode expansion valve, low pressure side indoor heat exchanger and a refrigerant-cooling water heat exchanger; an air conditioning mode branch line branched from the refrigerant circulation line and configured to, in an air conditioning mode, form a cooling loop by circulating a refrigerant through the compressor, the high pressure side indoor heat exchanger, the outdoor heat exchanger, the air conditioning mode expansion valve and low pressure side indoor heat exchanger. Heat pump mode branch line branched from the refrigerant circulation line is configured, in heat pump mode to form a heating loop by circulating the refrigerant through the compressor, the high pressure side indoor heat exchanger, the heat pump mode expansion valve and the refrigerant-cooling water heat exchanger.

14 Claims, 12 Drawing Sheets

(51) Int. Cl.
  *B60H 1/06* (2006.01)
  *B60H 1/14* (2006.01)
(52) U.S. Cl.
  CPC ..... *B60H 1/00328* (2013.01); *B60H 1/00485* (2013.01); *B60H 1/00899* (2013.01); *B60H 1/06* (2013.01); *B60H 1/143* (2013.01); *B60H 2001/0015* (2013.01); *B60H 2001/00164* (2013.01)
(58) Field of Classification Search
  CPC ...... B60H 1/00899; B60H 1/06; B60H 1/143; B60H 2001/0015; B60H 2001/00164
  USPC ........................................................ 165/202
  See application file for complete search history.

(56) References Cited

U.S. PATENT DOCUMENTS

2013/0319029 A1* 12/2013 Sekiya ............... B60H 1/00899
                                                62/238.7
2017/0369080 A1* 12/2017 Mijin ................ B61D 27/0063

* cited by examiner

VEHICULAR HEAT MANAGEMENT SYSTEM

This application claims priority from Korean Patent. Application Nos. 10-2018-0093484 filed on Aug. 10, 2018 and 1.0-2018-0093488 filed on Aug. 10, 2018. The entire contents of these applications are incorporated herein by reference in their entirety.

TECHNICAL FIELD

The present invention relates to a vehicular heat management system and, more particularly, to a vehicular heat management system capable of simplifying a structure of a refrigerant circulation line with no reduction in the performance of an air conditioning system, reducing the number of various valve components, saving a manufacturing cost, improving a refrigerant pressure loss in pipes and enhancing the passenger compartment cooling/heating performance.

BACKGROUND ART

A hybrid vehicle is a vehicle that uses an electric motor and an internal combustion engine in combination. When the hybrid vehicle is running at a high load, for example, when the hybrid vehicle is running at a high speed or on an uphill, the hybrid vehicle comes into an engine driven mode in which an engine is used.

Conversely, the hybrid vehicle is running at a low load, for example, when the hybrid vehicle is running at a low speed or stopped, the hybrid vehicle comes into a motor driven mode in which an electric motor is used.

Such a hybrid vehicle (hereinafter generally referred to as "vehicle") is equipped with various heat management systems. For example, as shown in FIG. 1, the vehicle includes an air conditioning system 10 for cooling and heating a passenger compartment, a water-cooled cooling system 20 for cooling an electric component module C, and the like.

The air conditioning system 10 is a heat pump type and is provided with a refrigerant circulation line 12. The refrigerant circulation line 12 includes a compressor 14, a high pressure side indoor heat exchanger 15, a heat pump mode expansion valve 16, an outdoor heat exchanger 17, an air conditioning mode expansion valve 18 and a low pressure side indoor heat exchanger 19.

The refrigerant circulation line 12 causes the heat pump mode expansion valve 16 to be opened in an air conditioning mode so that the refrigerant can be circulated without passing through the heat pump mode expansion valve 16. By way of such refrigerant circulation, cold air having a low temperature is generated in the low pressure side indoor heat exchanger 19 and is supplied into a passenger compartment to cool the passenger compartment.

In the heat pump mode, the heat pump mode expansion valve 16 is opened so that the internal refrigerant can be circulated through the heat pump mode expansion valve 16. By virtue of such refrigerant circulation, heat having a high temperature is generated in the high pressure side indoor heat exchanger 15 and is supplied into the passenger compartment to heat the passenger compartment.

The water-cooled cooling system 20 is provided with a cooling water circulation line 22. The cooling water circulation line 22 includes a water pump 24 and a radiator 25.

The cooling water circulation line 22 circulates the cooling water between the radiator 25 and the electric component module C to cool the electric component module C.

On the other hand, when the temperature of the outdoor heat exchanger 17 serving as an evaporator is lowered to a low temperature in a state in which the air conditioning system 10 is controlled in the heat pump mode, there is a possibility that icing is generated on the surface of the outdoor heat exchanger 17.

Therefore, the heat management system is equipped with an anti-icing device 30 for preventing the icing of the outdoor heat exchanger 17.

The anti-icing device 30 includes flow control valves 32 for bypassing the refrigerant before being introduced into the outdoor heat exchanger 17, and a refrigerant-cooling water heat exchanger 34 for causing the bypassed refrigerant to exchange heat with the cooling water of the water-cooled cooling system 20.

When icing is generated in the outdoor heat exchanger 17, the anti-icing device 30 enters an anti-icing mode in which the refrigerant before being introduced into the outdoor heat exchanger 17 is bypassed so as to exchange heat with the cooling water of the water-cooled cooling system 20.

Therefore, it is possible to release cold air from the refrigerant without using the outdoor heat exchanger 17, thereby preventing the icing of the outdoor heat exchanger 17.

At the time of entry into the anti-icing mode, the water-cooled cooling system 20 controls the flow control valve 20a so that the cooling water in the cooling water circulation line 22 is supplied to the electric component module C and the refrigerant-cooling water heat exchanger 34.

In such a conventional heat management system, it is important to simplify the structure and reduce the number of parts, thereby reducing the cost.

In recent years, it has become very important to reduce the price of a vehicle by reducing the manufacturing cost thereof. As described above, the structure of the refrigerant circulation line 12 is complicated and a large number of flow control valves 32 are required in the conventional heat management system. Therefore, it is not possible to reduce the manufacturing cost of the vehicle.

Therefore, in order to reduce the manufacturing cost of the vehicle, it is necessary to simplify the structure of the refrigerant circulation line 12 and to reduce the number of components, thereby reducing the manufacturing cost of the heat management system.

In addition, in the conventional heat management system, it is important to increase the refrigerant flow characteristic of the refrigerant circulation line 12 to improve the cooling/heating performance of the air conditioning system 10.

In particular, in the case of the refrigerant, the pressure loss increases as the length of a pipe becomes longer. This may lead to deterioration of the cooling/heating performance of the air conditioning system 10. Therefore, in order to improve the cooling/heating performance of the air conditioning system 10, it is necessary to reduce the length of a pipe to surely reduce the refrigerant pressure loss in the pipe.

Furthermore, in the case of the refrigerant, a large pressure loss is generated in the low pressure side pipe, thereby deteriorating the cooling/heating performance of the air conditioning system 10. Therefore, in order to improve the cooling/heating performance of the air conditioning system 10, it is necessary to improve the refrigerant pressure loss in the low pressure side pipe.

SUMMARY

In view of the aforementioned problems inherent in the related art, it is an object of the present invention to provide a vehicular heat management system capable of simplifying a structure of a refrigerant circulation line with no reduction in the performance of an air conditioning system and reducing the number of flow control valves.

Another object of the present invention is to provide a vehicular heat management system capable of reducing the number of components and saving a manufacturing cost.

A further object of the present invention is to provide a vehicular heat management system capable of reducing a refrigerant pressure loss in a pipe and consequently enhancing the cooling/heating performance for a passenger compartment.

A still further object of the present invention is to provide a vehicular heat management system capable of enhancing the cooling/heating performance for a passenger compartment and improving the fuel efficiency of a vehicle.

According to one aspect of the present invention, there is provided a vehicular heat management system, including: a refrigerant circulation line including a compressor, a high pressure side indoor heat exchanger, a heat pump mode expansion valve, an outdoor heat exchanger, an air conditioning mode expansion valve, a low pressure side indoor heat exchanger and a refrigerant-cooling water heat exchanger; an air conditioning mode branch line branched from the refrigerant circulation line and configured to, in an air conditioning mode, form a cooling loop by circulating a refrigerant through the compressor, the high pressure side indoor heat exchanger, the outdoor heat exchanger, the air conditioning mode expansion valve and the low pressure side indoor heat exchanger; and a heat pump mode branch line branched from the refrigerant circulation line and configured to, in a heat pump mode, form a heating loop by circulating the refrigerant through the compressor, the high pressure side indoor heat exchanger, the heat pump mode expansion valve and the refrigerant-cooling water heat exchanger, wherein the air conditioning mode branch line and the heat pump mode branch line are separate and independent from each other from a branch point in the refrigerant circulation line to the compressor so that the cooling loop and the heating loop are separated from each other from the branch point in the refrigerant circulation line to the compressor.

The heat pump mode expansion valve may be configured to pass the refrigerant on the side of the high pressure side indoor heat exchanger without changing a pressure in the air conditioning mode and to depressurize and expand the refrigerant on the side of the high pressure side indoor heat exchanger in the heat pump mode, and the air conditioning mode branch line and the heat pump mode branch line may be branched from the refrigerant circulation line on the downstream side of the heat pump mode expansion valve.

The heat pump mode expansion valve may be installed on the heat pump mode branch line so as to depressurize and expand the refrigerant on the side of the high pressure side indoor heat exchanger only in the heat pump mode.

The heat pump mode expansion valve may be installed in the heat pump mode branch line between a branch point, at which the heat pump mode branch line is branched from the air conditioning mode branch line, and the refrigerant-cooling water heat exchanger.

The system may further include: a flow control valve configured to introduce the refrigerant in the refrigerant circulation line into the air conditioning mode branch line in the air conditioning mode and to introduce the refrigerant in the refrigerant circulation line into the heat pump mode branch line in the heat pump mode.

The flow control valve may be a three-way valve installed at a branch point of the air conditioning mode branch line and the heat pump mode branch line.

The flow control valve may be a two-way valve installed on the air conditioning mode branch line, and the flow control valve may be configured to allow the refrigerant in the compressor to be introduced into the air conditioning mode branch line when the air conditioning mode branch line is opened, and to allow the refrigerant in the compressor to be introduced into the heat pump mode branch line when the air conditioning mode branch line is closed.

According to the present invention, the vehicular heat management system is provided with the refrigerant circulation line. The cooling loop and the heating loop of the refrigerant circulation line are separate and independent from each other. Therefore, compared with the conventional structure in which the cooling loop and the heating loop are mixed, the structure of the refrigerant pipe is simple.

Since the structure of the refrigerant pipe is very simple, it is easy to arrange and design the refrigerant pipe. This makes it possible to shorten the length of the refrigerant pipe and to reduce the number of valves.

Since the length of the refrigerant pipe can be shortened and the number of valves can be reduced, it is possible to reduce the refrigerant pressure loss in the refrigerant pipe and to reduce the number of components, whereby the cooling/heating performance of the air conditioning system can be improved and the cost reduction can be achieved.

Since the cooling loop and the heating loop of the refrigerant circulation line are separate and independent, the outdoor heat exchanger installed on the cooling loop can be used exclusively in the air conditioning mode. Therefore, unlike the conventional outdoor heat exchanger used even in the heat pump mode, there is no possibility that icing occurs in the outdoor heat exchanger.

Since the cooling loop and the heating loop of the refrigerant circulation line are separate and independent, and since the heat pump mode expansion valve required for heating the passenger compartment is installed on the heating loop, the heat pump mode expansion valve is operated only in the heat pump mode. Thus, it is possible to simplify the structure as compared with the conventional heat pump mode expansion valve used in both the cooling loop and the heating loop. As a result, it is possible to reduce the cost.

Since the cooling loop and the heating loop of the refrigerant circulation line are separate and independent, and since the heat pump mode expansion valve is installed on the heating loop, the position of the heat pump mode expansion valve with respect to the compressor can be moved to the downstream side as far as possible regardless of the cooling loop.

Since the position of the heat pump mode expansion valve with respect to the compressor can be moved to the downstream side as far as possible regardless of the cooling loop, it is possible to increase the portion of the high pressure side pipe on the upstream side of the heat pump mode expansion valve and to minimize the portion of the low pressure side pipe on the downstream side of the heat pump mode expansion valve. As a result, it is possible to minimize the pressure loss generated in the low pressure side pipe.

Since the portion of the low pressure side pipe can be minimized and the pressure loss generated on the low pressure side pipe can be minimized, it is possible to suppress the deterioration of the cooling/heating performance of the air conditioning system due to the pressure loss and to enhance the cooling/heating performance of the air conditioning system.

DETAILED DESCRIPTION

Figure 1:
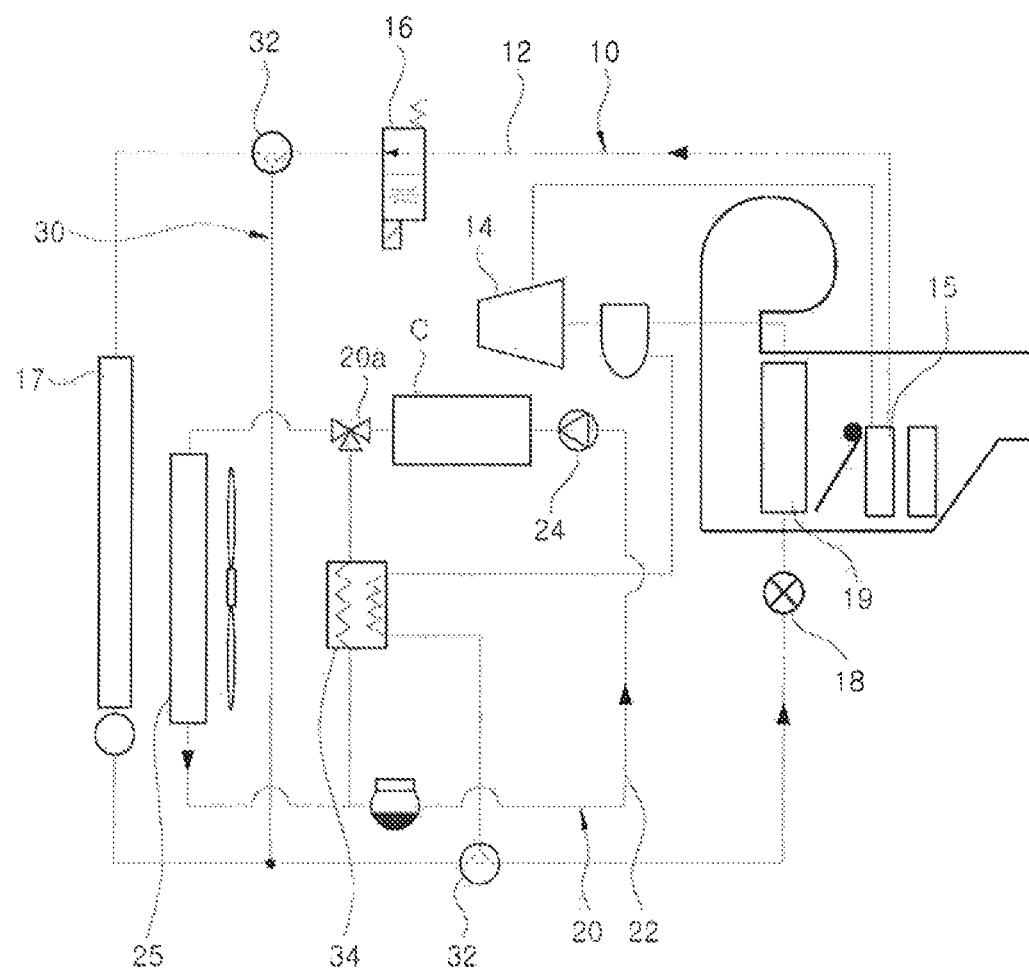
FIG. 1 is a detailed view of a conventional vehicular heat management system.

Preferred embodiments of a vehicular heat management system according to the present invention will now be described in detail with reference to the accompanying drawings.

First Embodiment

Prior to describing the characteristic parts of a vehicular heat management system according to the present invention, description will be made on a vehicular heat management system with reference to FIGS. 2 to 4.

The vehicular heat management system includes an air conditioning system 10 for cooling and heating a passenger compartment, and a water-cooled cooling system 20 for cooling an electric component module C.

The air conditioning system 10 is a heat pump type and is provided with a refrigerant circulation line 12. The refrigerant circulation line 12 includes a compressor 14, a high pressure side indoor heat exchanger 15, a heat pump mode expansion valve 16, an outdoor heat exchanger 17, an air conditioning mode expansion valve 18 and a low pressure side indoor heat exchanger 19.

Figure 3:
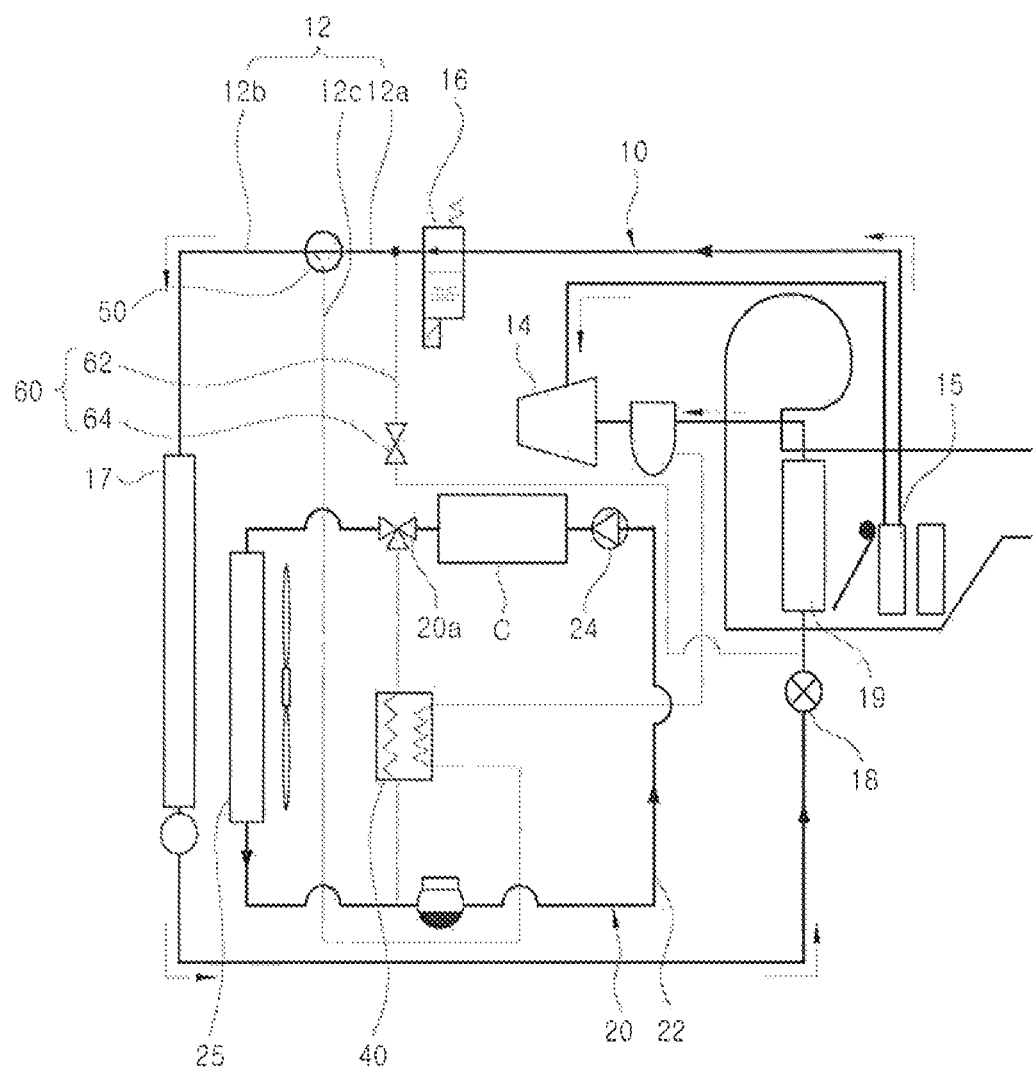
FIG. 3 is a view showing an operation example of the vehicular heat management system according to the first embodiment of the present invention, in which the air conditioning system is operated in an air conditioning mode.

The refrigerant circulation line 12 causes the heat pump mode expansion valve 16 to be opened in an air conditioning mode as shown in FIG. 3 so that a refrigerant can be circulated without passing through the heat pump mode expansion valve 16. By way of such refrigerant circulation, a cold air having a low temperature is generated in the low pressure side indoor heat exchanger 19 and is supplied into a passenger compartment to cool the passenger compartment.

Figure 4:
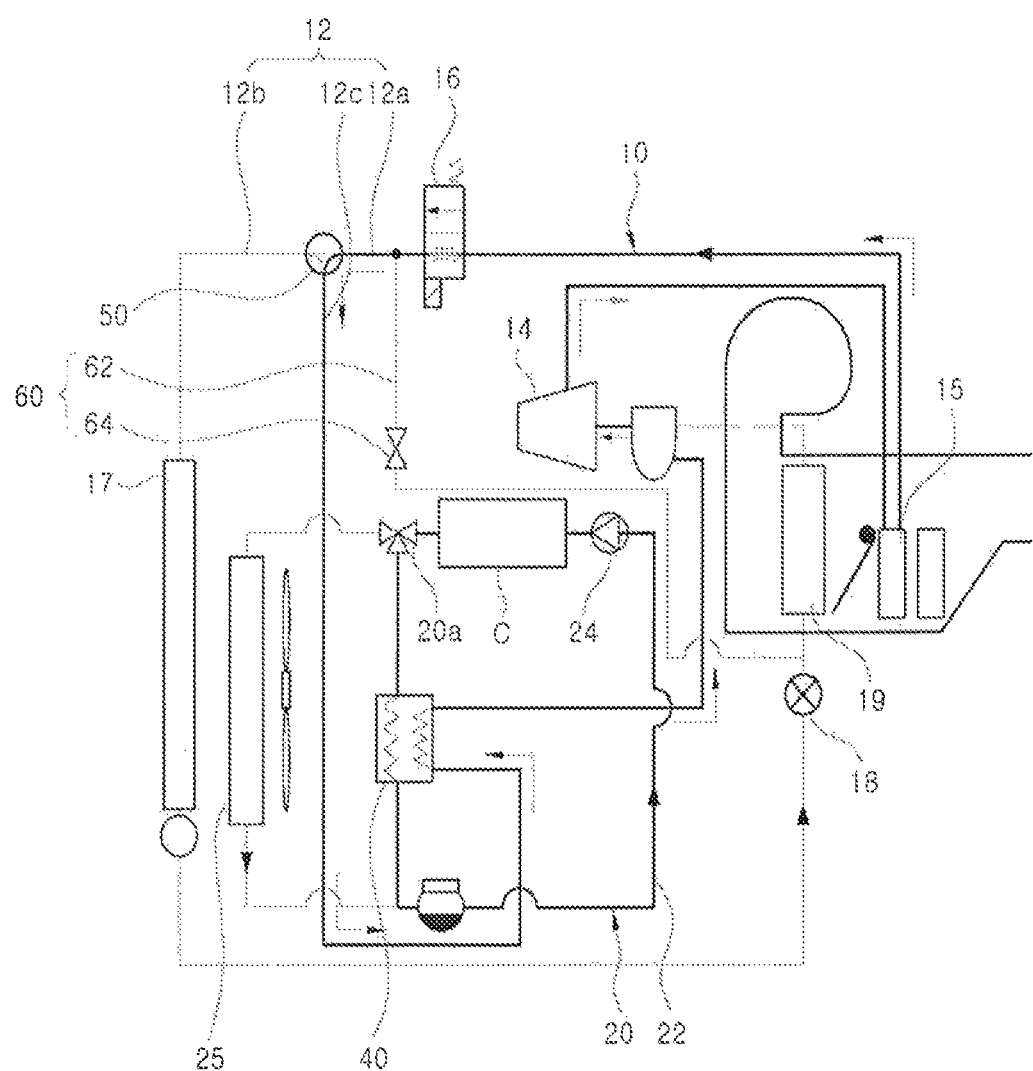
FIG. 4 is a view showing an operation example of the vehicular heat management system according to the first embodiment of the present invention, in which the air conditioning system is operated in a heat pump mode.

In the heat pump mode, as shown in FIG. 4, the heat pump mode expansion valve 16 is opened so that the internal refrigerant can be circulated through the heat pump mode expansion valve 16. By virtue of such refrigerant circulation, heat having a high temperature is generated in the high pressure side indoor heat exchanger 15 and is supplied into the passenger compartment to heat the passenger compartment.

The water-cooled cooling system 20 is provided with a cooling water circulation line 22. The cooling water circulation line 22 includes a water pump 24 and a radiator 25.

The cooling water circulation line 22 circulates cooling water between the radiator 25 and the electric component module C to cool the electric component module C.

Next, the features of the vehicular heat management system according to the present invention will be described in detail with reference to FIGS. 2 to 6.

Figure 2:
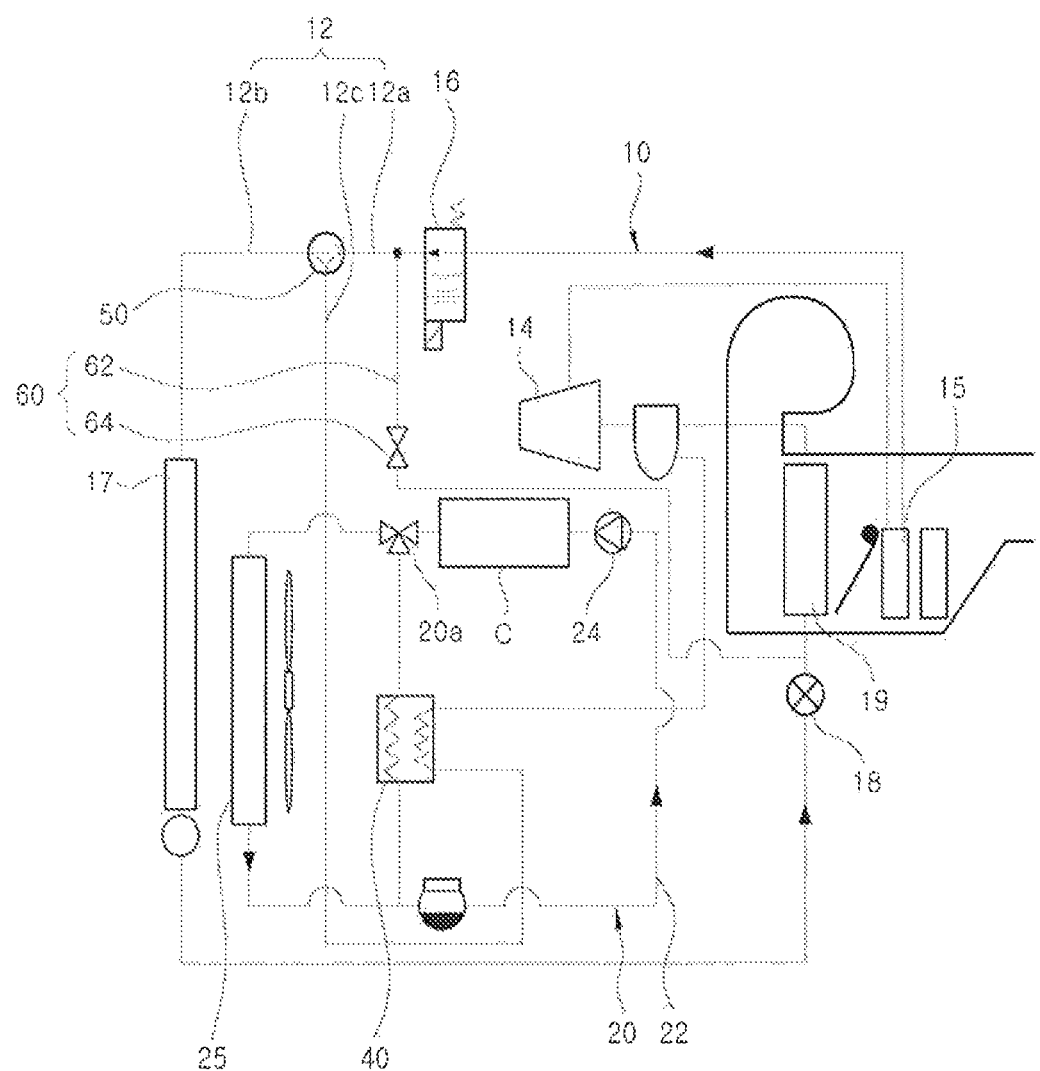
FIG. 2 is a detailed view showing a vehicular heat management system according to a first embodiment of the present invention.

Referring first to FIG. 2, the heat management system of the present invention includes a refrigerant circulation line 12 of the air conditioning system 10. The refrigerant circulation line 12 includes a main line 12a, an air conditioning mode branch line 12b branched from the main line 12a, and a heat pump mode branch line 12c branched from the main line 12a.

The main line 12a is configured to transfer the refrigerant discharged from the compressor 14 and is provided with a high pressure side indoor heat exchanger 15 and a heat pump mode expansion valve 16. In the heat pump mode, the high pressure side indoor heat exchanger 15 causes the high temperature refrigerant discharged from the compressor 14 to exchange heat with air to be supplied into passenger compartment, thereby heating the passenger compartment.

The air conditioning mode branch line 12b is provided with an outdoor heat exchanger 17, an air conditioning mode expansion valve 18 and a low pressure side indoor heat exchanger 19. In the air conditioning mode, as shown in FIG. 3, the high pressure refrigerant fed from the main line 12a is depressurized and expanded by the air conditioning mode expansion valve 18. The depressurized/expanded refrigerant is caused to exchange heat with air to be blown into the passenger compartment in the low pressure side indoor heat exchanger 19, thereby cooling the passenger compartment. The heat-exchanged refrigerant is returned to the compressor 14.

The heat pump mode branch line 12c is provided with a refrigerant-cooling water heat exchanger 40. In the heat pump mode, as shown in FIG. 4, the refrigerant depressurized and expanded in the heat pump mode expansion valve 16 of the main line 12a is introduced into the heat pump mode branch line 12c. The introduced refrigerant is heat-exchanged with the cooling water of the cooling water circulation line 22 in the refrigerant-cooling water heat exchanger 40. The heat-exchanged refrigerant is returned to the compressor 14.

The refrigerant heat-exchanged in the refrigerant-cooling water heat exchanger 40 merges with the refrigerant discharged from the low pressure side indoor heat exchanger 19 and returns to the compressor 14.

On the other hand, a flow control valve 50 is provided at a branch point between the air conditioning mode branch line 12b and the heat pump mode branch line 12c.

The flow control valve 50 is a three-way control valve and is configured to introduce the refrigerant of the main line 12a into either the air conditioning mode branch line 12b or the heat pump mode branch line 12c.

In the air conditioning mode, as shown in FIG. 3, the refrigerant of the main line 12a is introduced into the air conditioning mode branch line 12b. In the heat pump mode, as shown in FIG. 4, the refrigerant in the main line 12a is introduced into the heat pump mode branch line 12c.

Therefore, in the air conditioning mode, the main line 12a and the air conditioning mode branch line 12b form a cooling loop to cool the passenger compartment. In the heat pump mode, the main line 12a and the heat pump mode branch line 12c form a heating loop to heat the passenger compartment.

The air conditioning system 10 has a structure in which the cooling loop formed of the main line 12a and the air conditioning mode branch line 12b and the heating loop formed of the main line 12a and the heat pump mode branch line 12c are separated from each other. Therefore, the configuration of the refrigerant pipe is simplified as compared with the prior art of FIG. 1 in which the cooling loop and the heating loop are used in combination.

Particularly, the refrigerant flow lines of the cooling loop and the heating loop from the branch point of the air conditioning mode branch line 12b and the heat pump mode branch line 12c to the inlet of the compressor 14 are completely separate and independent. Therefore, the configuration of the pipe is very simple, and the configuration of the valve is also simplified.

Accordingly, the arrangement and design of the refrigerant pipe are easy, the length of the refrigerant pipe can be shortened, and the number of valves can be reduced. Thus, the refrigerant pressure loss generated in the refrigerant pipe can be reduced, and the number of components can be reduced. As a result, it is possible to enhance the cooling/heating performance of the air conditioning system 10 and to reduce the cost.

Since the air conditioning system 10 has a structure in which the cooling loop formed of the main line 12a and the air conditioning mode branch line 12b and the heating loop formed of the main line 12a and the heat pump mode branch line 12c are separated from each other, the outdoor heat exchanger 17 of the air conditioning mode branch line 12b can be used exclusively in the air conditioning mode.

Therefore, unlike the conventional outdoor heat exchanger 17 (see FIG. 1) used even in the heat pump mode, there is no possibility that icing occurs in the outdoor heat exchanger 17.

Referring again to FIG. 2, the air conditioning system 10 further includes a dehumidifying unit 60 capable of dehumidifying the air existing in the passenger compartment.

The dehumidifying unit 60 includes a bypass line 62 branched from the main line 12a on the downstream side of the heat pump mode expansion valve 16 and connected to the inlet of the low pressure side indoor heat exchanger 19, and an on-off valve 64 installed in the bypass line 62.

The bypass line 62 bypasses the refrigerant in the main line 12a depressurized and expanded while passing through the heat pump mode expansion valve 16 and introduces the bypassed refrigerant into the low pressure side indoor heat exchanger 19.

When the humidity in the passenger compartment is high during the heat pump mode, the on-off valve 64 is opened automatically or manually to open the bypass line 62.

Figure 5:
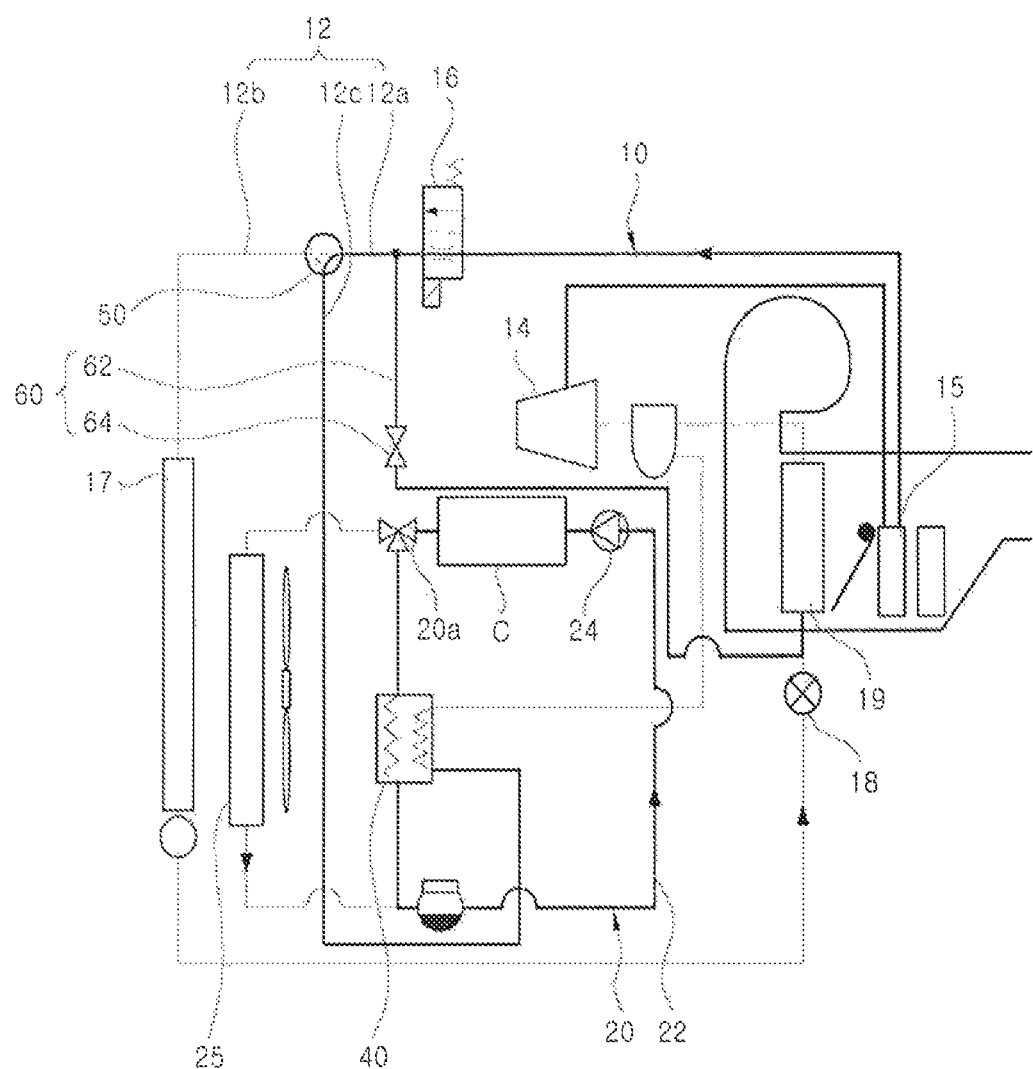
FIG. 5 is a view showing an operation example of the vehicular heat management system according to the first embodiment of the present invention, in which the air conditioning system is operated in both a heat pump mode and a dehumidifying mode.

Therefore, as shown in FIG. 5, the refrigerant depressurized and expanded while passing through the heat pump mode expansion valve 16 can be introduced into the low pressure side indoor heat exchanger 19. The low temperature refrigerant introduced into the low pressure side indoor heat exchanger 19 can exchange heat with air blown into the passenger compartment, thereby removing the moisture present in the air.

The dehumidifying unit 60 is configured to dehumidify the air present in the passenger compartment in the heat pump mode. Thus, the comfort in the passenger compartment is remarkably improved in the heat pump mode.

Figure 6:
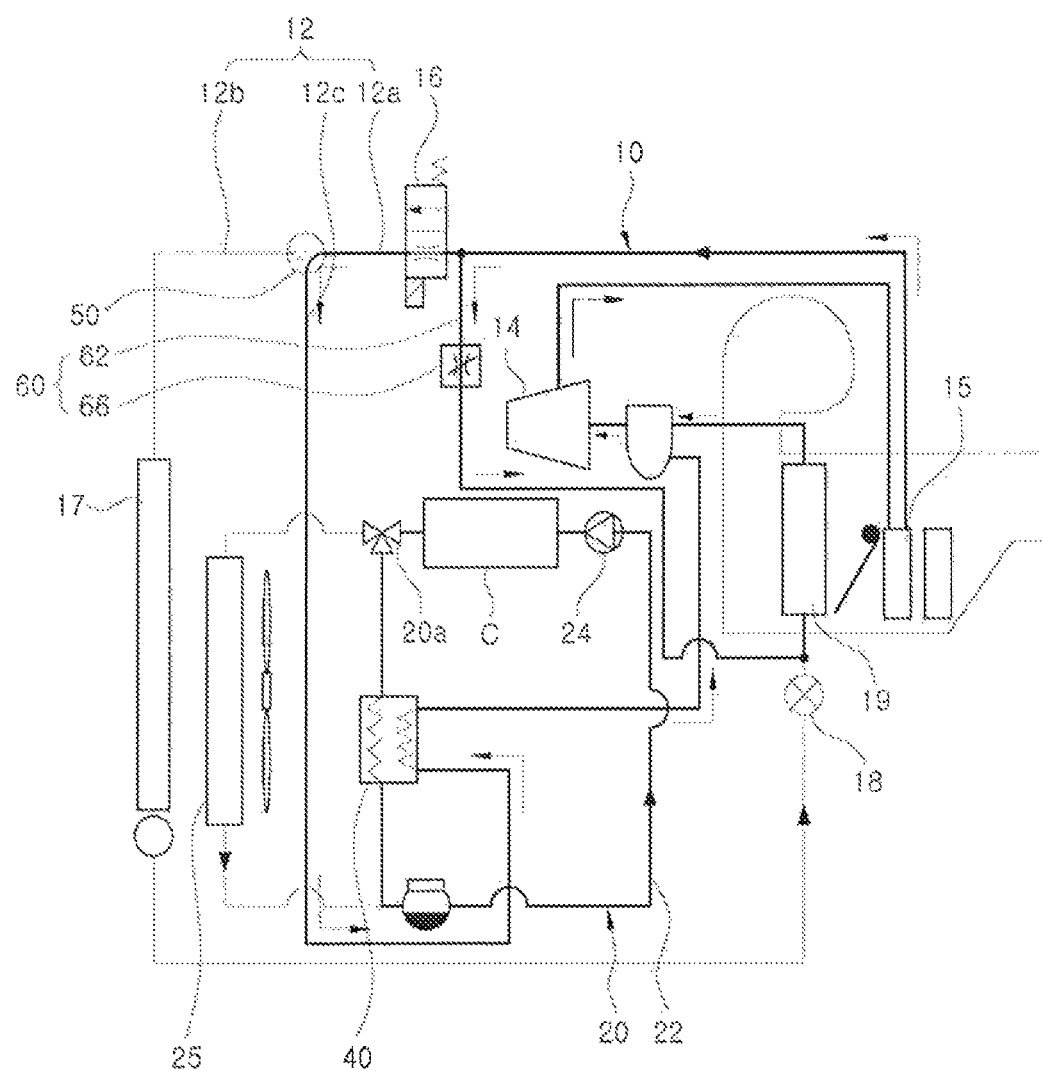
FIG. 6 is a view showing another example of the dehumidifying unit constituting the heat management system according to the first embodiment of the present invention.

FIG. 6 shows another example of the dehumidifying unit 60. The dehumidifying unit 60 of another example is provided with a bypass line 62. The bypass line 62 bypasses the refrigerant in the main line 12a on the upstream side of the heat pump mode expansion valve 16.

This bypass line 62 serves to bypass the high pressure refrigerant before being introduced into the heat pump mode expansion valve 16.

The dehumidifying unit 60 of another example further includes a dehumidifying expansion valve 66 provided in the bypass line 62.

The dehumidifying expansion valve 66 is a variable solenoid valve in which the opening degree of a throttle flow path is variably controlled depending on the magnitude of the applied voltage. The dehumidifying expansion valve 66 depressurizes and expands the high pressure refrigerant bypassed to the bypass line 62 into a refrigerant having a low temperature and a low pressure.

Thus, the low pressure refrigerant can be introduced into the low pressure side indoor heat exchanger 19. The low-temperature low-pressure refrigerant introduced into the low pressure side indoor heat exchanger 19 is heat-exchanged with air to be blown into the passenger compartment, thereby removing the moisture present in the air.

According to the dehumidifying unit 60 of another example having such a structure, the variable dehumidifying expansion valve 66 can be used to automatically control the depressurization/expansion amount of the refrigerant introduced into the low pressure side indoor heat exchanger 19. Therefore, it is possible to automatically control the temperature of the low pressure side indoor heat exchanger 19 and to automatically adjust the dehumidifying amount of the air blown into the passenger compartment.

Second Embodiment

Next, a vehicular heat management system according to a second embodiment of the present invention will be described with reference to FIGS. 7 to 11.

Figure 7:
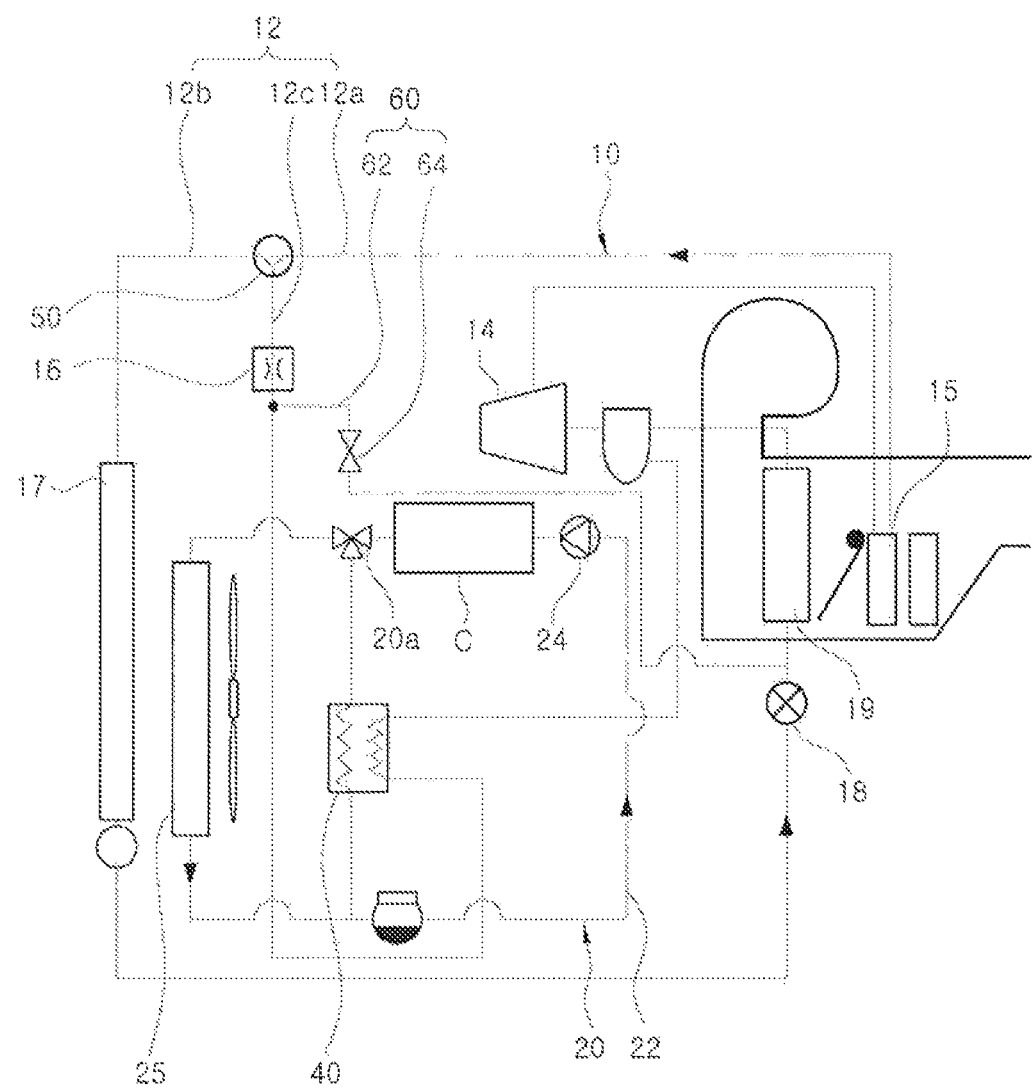
FIG. 7 is a detailed view showing a vehicular heat management system according to a second embodiment of the present invention.
Figure 8:
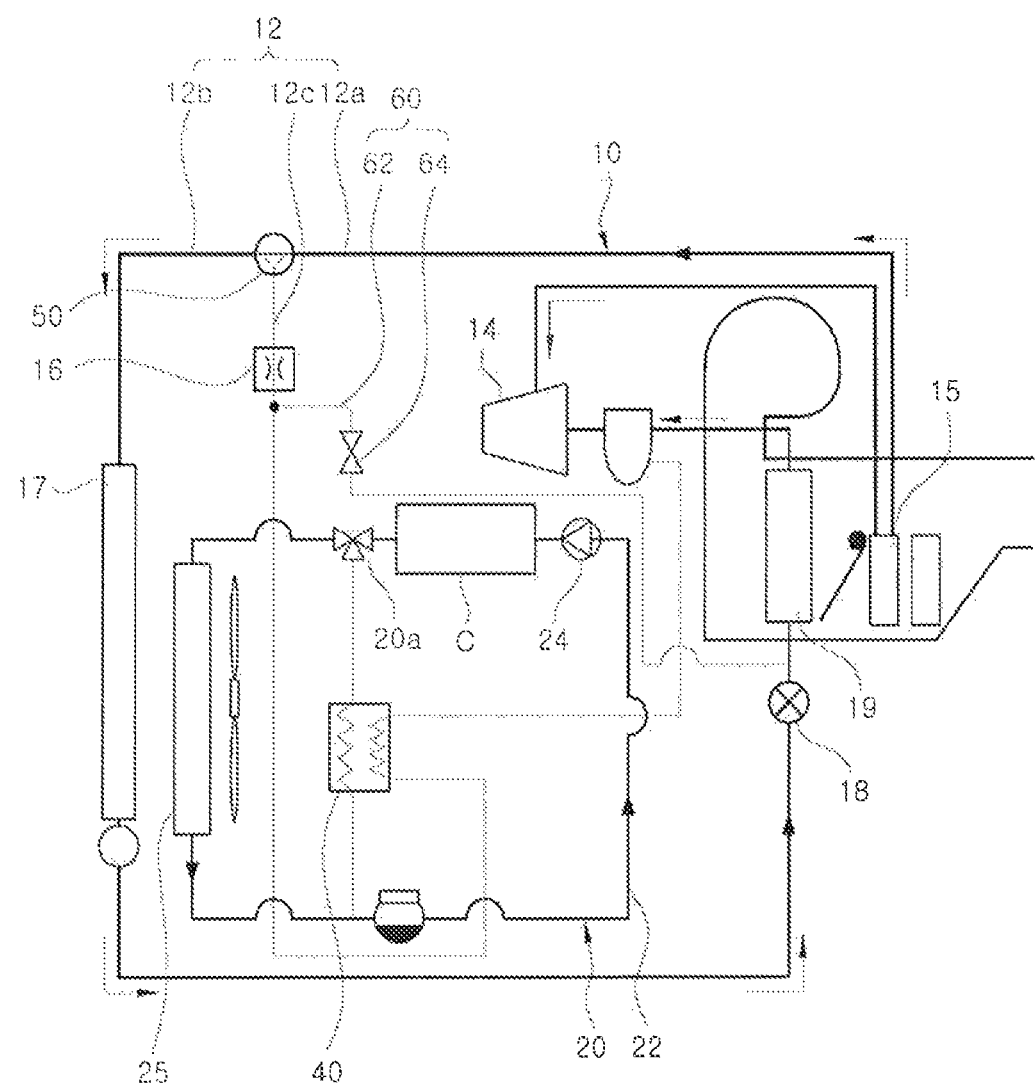
FIG. 8 is a view showing an operation example of the vehicular heat management system according to the second embodiment of the present invention, in which the air conditioning system is operated in an air conditioning mode.

Referring first to FIG. 7, the heat management system according to the second embodiment has substantially the same structure as the heat management system of the first embodiment described above.

The heat management system according to the second embodiment differs from the heat management system structure of the first embodiment in that the heat pump mode expansion valve 16 of the air conditioning system 10 required for heating the passenger compartment is installed in the heat pump mode branch line 12c (see FIG. 2).

The heat pump mode expansion valve 16 is preferably provided in the heat pump mode branch line 12c between the branch point, at which the heat pump mode branch line 12c is branched from the air conditioning mode branch line 12b, and the refrigerant-cooling water heat exchanger 40.

Figure 9:
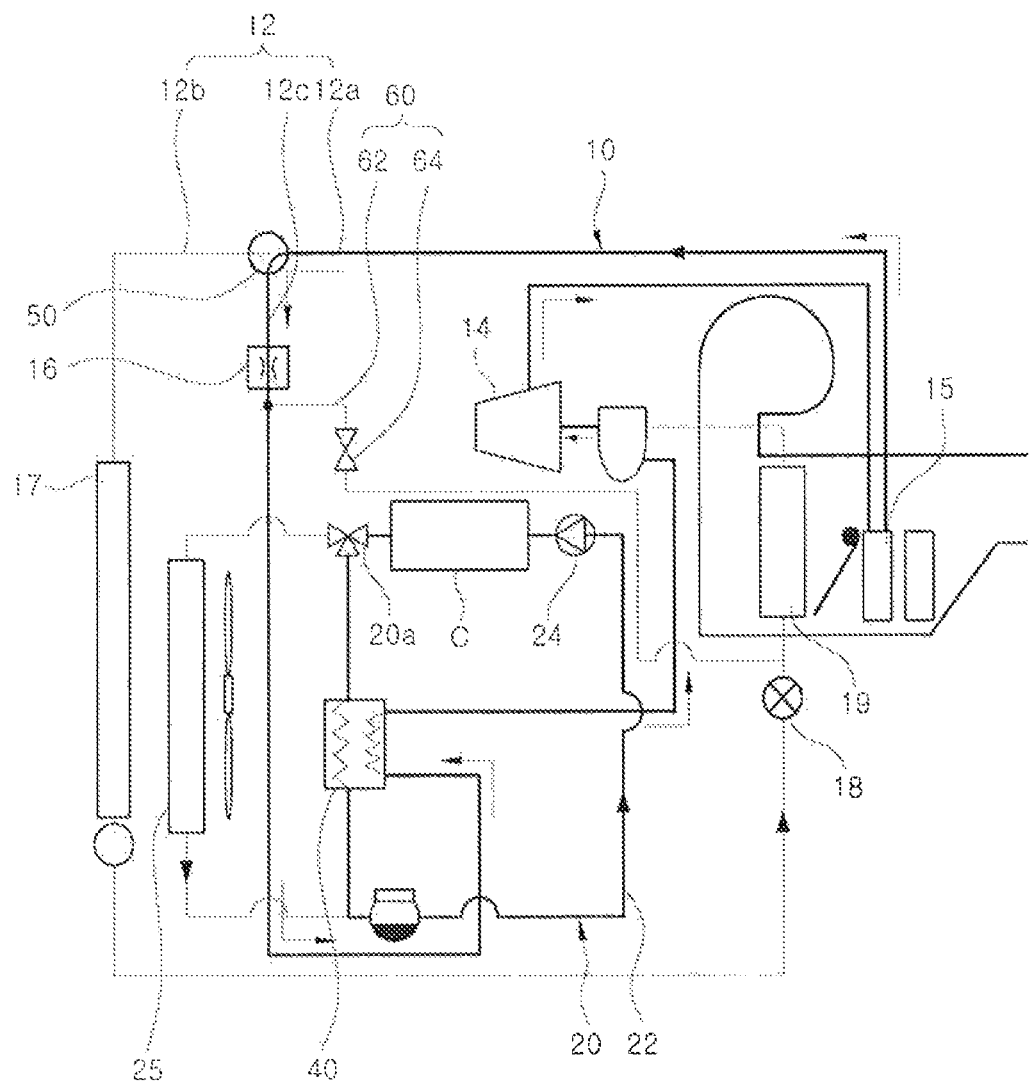
FIG. 9 is a view showing an operation example of the vehicular heat management system according to the second embodiment of the present invention, in which the air conditioning system is operated in a heat pump mode.

The heat management system according to the second embodiment has a structure in which the cooling loop of the main line 12a and the air conditioning mode branch line 12b is separated from the heating loop of the main line 12a and the heat pump mode branch line 12c and then the heat pump mode expansion valve 16 necessary for heating the passenger compartment is installed in the heat pump mode branch line 12c of the heating loop. Therefore, as shown in FIG. 9, the heat pump mode expansion valve 16 can be used only in the heat pump mode.

Therefore, unlike the conventional heat pump mode expansion valve 16 (see FIG. 1) installed in the refrigerant circulation line 12 in which the cooling loop and the heating loop are mixed, it is possible to simplify the structure of the heat pump mode expansion valve 16.

Particularly, in the conventional structure, it is necessary for the heat pump mode expansion valve 16 to control both the refrigerant in the air conditioning mode and the refrigerant in the heat pump mode. Thus, the heat pump mode expansion valve 16 has a two-position switching structure. On the other hand, the heat pump mode expansion valve 16 of the second embodiment has a structure in which only the refrigerant in the heat pump mode is controlled. Therefore, the heat pump mode expansion valve 16 has a one-position structure.

As a result, it is possible to simplify the structure of the heat pump mode expansion valve 16, thereby reducing the cost.

In addition, the air conditioning system 10 of the second embodiment has a structure in which the heat pump mode expansion valve 16 is installed in the heat pump mode branch line 12c between the branch point, at which the heat pump mode branch line 12c is branched from the air conditioning mode branch line 12b, and the refrigerant-cooling water heat exchanger 40.

Therefore, as compared with the conventional heat pump mode expansion valve 16 (see FIG. 1) which is installed on the upstream side of the branch point of the air conditioning mode branch line 12b and heat pump mode branch line 12c, the position of the heat pump mode expansion valve 16 can be moved to the downstream side of the compressor 14 as far as possible.

Therefore, it is possible to increase the portion of the high pressure side pipe on the upstream side of the heat pump mode expansion valve 16 and to minimize the portion of the low pressure side pipe on the downstream side of the heat pump mode expansion valve 16. As a result, it is possible to minimize the pressure loss generated in the low pressure side pipe.

In particular, the pressure loss generated on the low pressure side pipe can be minimized in the heat pump mode. This makes it possible to suppress the deterioration of the heating performance of the air conditioning system 10 due to the pressure loss and to enhance the heating performance of the air conditioning system 10.

Referring again to FIG. 7, the heat management system of the second embodiment includes a dehumidifying unit 60 capable of dehumidifying the air present in the passenger compartment when the air conditioning system 10 is in the heat pump mode.

The dehumidifying unit 60 includes a bypass line 62 branched from the heat pump mode branch line 12c on the downstream side of the heat pump mode expansion valve 16 and connected to the inlet of the low pressure side indoor heat exchanger 19, and an on-off valve 64 installed in the bypass line 62.

The bypass line 62 bypasses the refrigerant in the heat pump mode branch line 12c depressurized and expanded while passing through the heat pump mode expansion valve 16 and introduces the bypassed refrigerant into the low pressure side indoor heat exchanger 19.

When the humidity in the passenger compartment is high during the heat pump mode, the on-off valve 64 is opened automatically or manually to open the bypass line 62.

Figure 10:
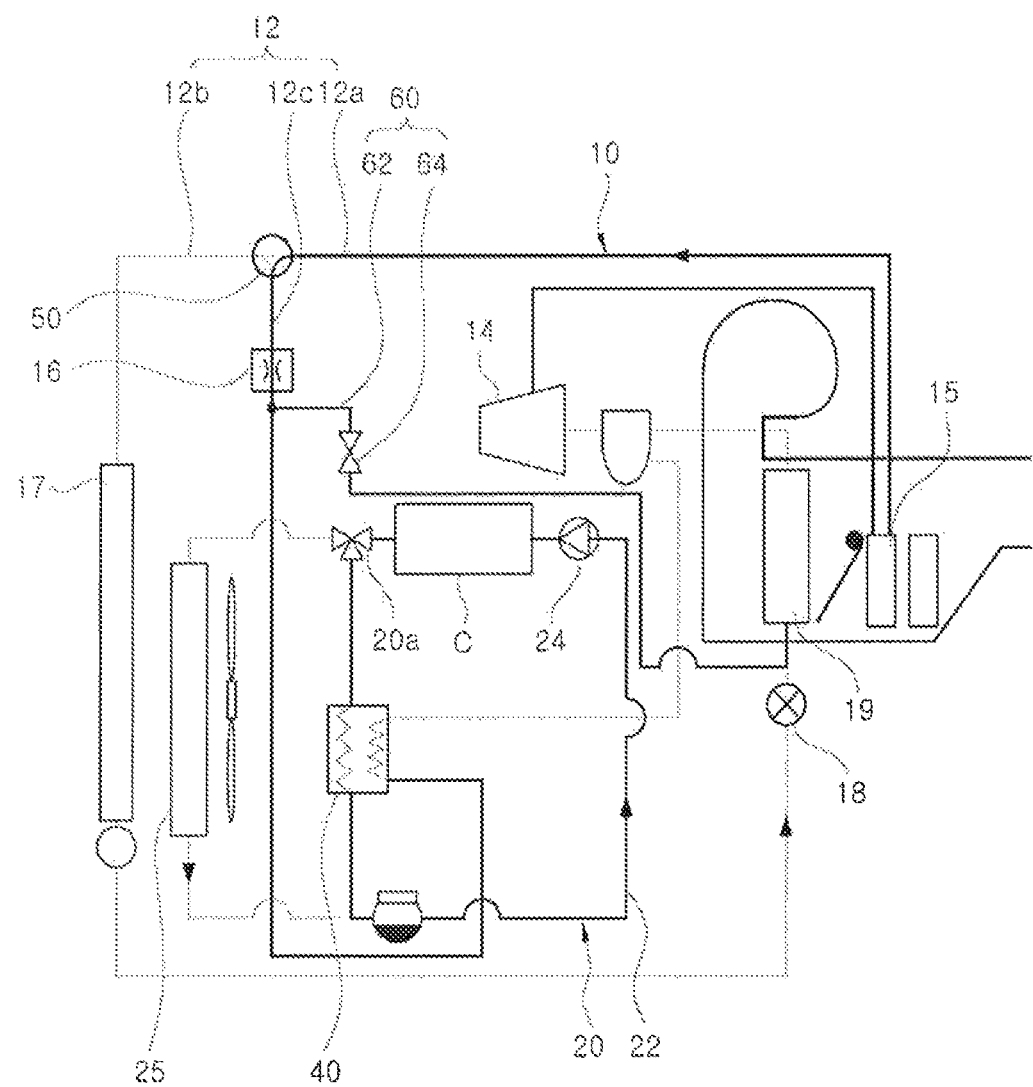
FIG. 10 is a view showing an operation example of the vehicular heat management system according to the second embodiment of the present invention, in which the air conditioning system is operated in both a heat pump mode and a dehumidifying mode.

Therefore, as shown in FIG. 10, the refrigerant depressurized and expanded while passing through the heat pump mode expansion valve 16 can be introduced into the low pressure side indoor heat exchanger 19. The low temperature refrigerant introduced into the low pressure side indoor heat exchanger 19 can exchange heat with air blown into the passenger compartment, thereby removing the moisture present in the air.

The dehumidifying unit 60 is configured to dehumidify the air present in the passenger compartment in the heat pump mode. Thus, the comfort in the passenger compartment is remarkably improved in the heat pump mode.

Figure 11:
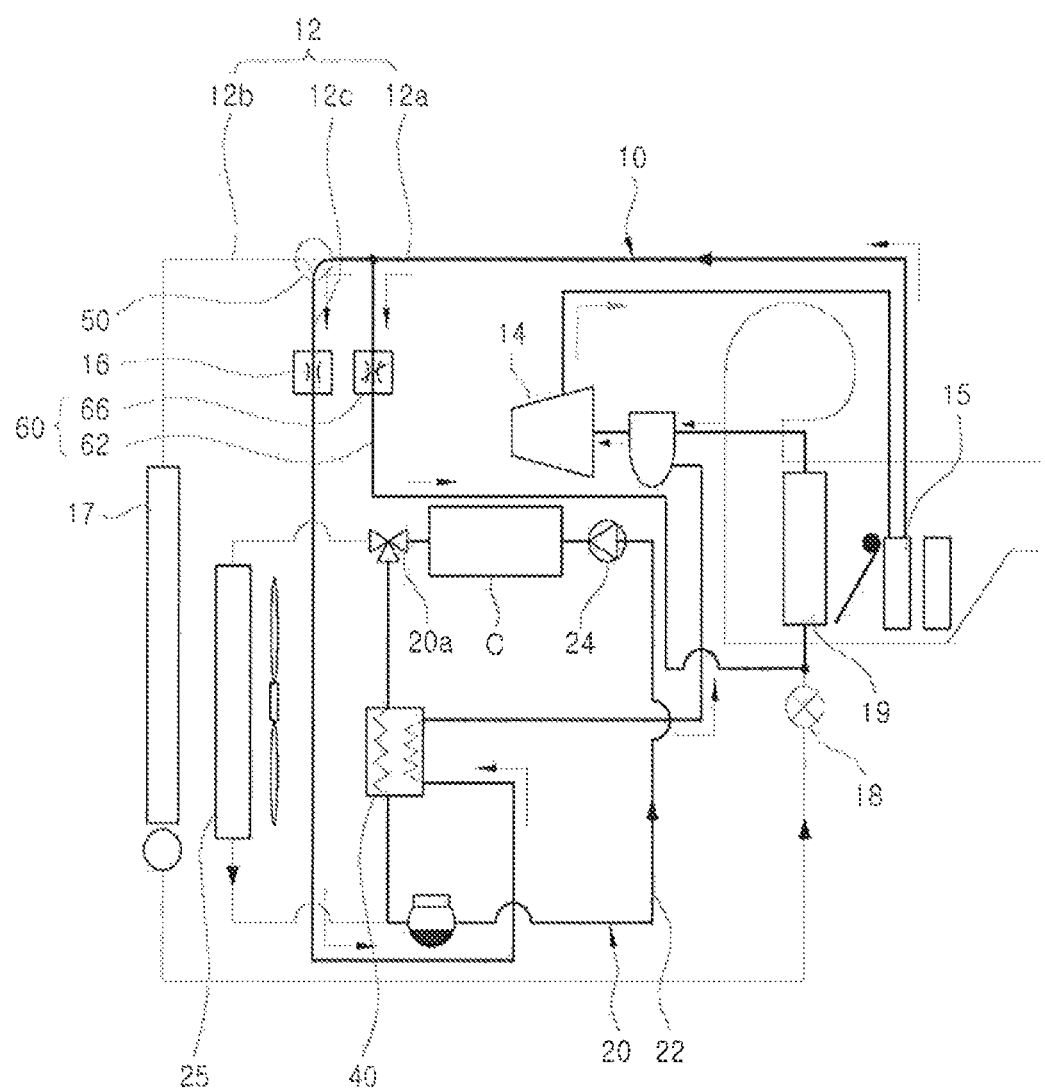
FIG. 11 is a view showing another example of the dehumidifying part constituting the heat management system according to the second embodiment of the present invention.

FIG. 11 shows another example of the dehumidifying unit 60. The dehumidifying unit 60 of another example is provided with a bypass line 62. The bypass line 62 is configured to bypasses the refrigerant existing on the upstream side of the branch point of the air conditioning mode branch line 12b and the heat pump mode branch line 12c.

This bypass line 62 serves to bypass the high pressure refrigerant before being introduced into the heat pump mode expansion valve 16 of the heat pump mode branch line 12c.

The dehumidifying unit 60 of another example further includes a dehumidifying expansion valve 66 provided in the bypass line 62.

The dehumidifying expansion valve 66 is a variable solenoid valve in which the opening degree of a throttle flow path is variably controlled depending on the magnitude of the applied voltage. The dehumidifying expansion valve 66 depressurizes and expands the high pressure refrigerant bypassed to the bypass line 62 into a refrigerant having a low temperature and a low pressure.

Thus, the low pressure refrigerant can be introduced into the low pressure side indoor heat exchanger 19. The low-temperature low-pressure refrigerant introduced into the low pressure side indoor heat exchanger 19 is heat-exchanged with the air to be blown into the passenger compartment, thereby removing the moisture present in the air.

According to the dehumidifying unit 60 of another example having such a structure, the variable dehumidifying expansion valve 66 can be used to automatically control the depressurization/expansion amount of the refrigerant introduced into the low pressure side indoor heat exchanger 19. Therefore, it is possible to automatically control the temperature of the low pressure side indoor heat exchanger 19 and to automatically adjust the dehumidifying amount of the air blown into the passenger compartment.

Third Embodiment

Figure 12:
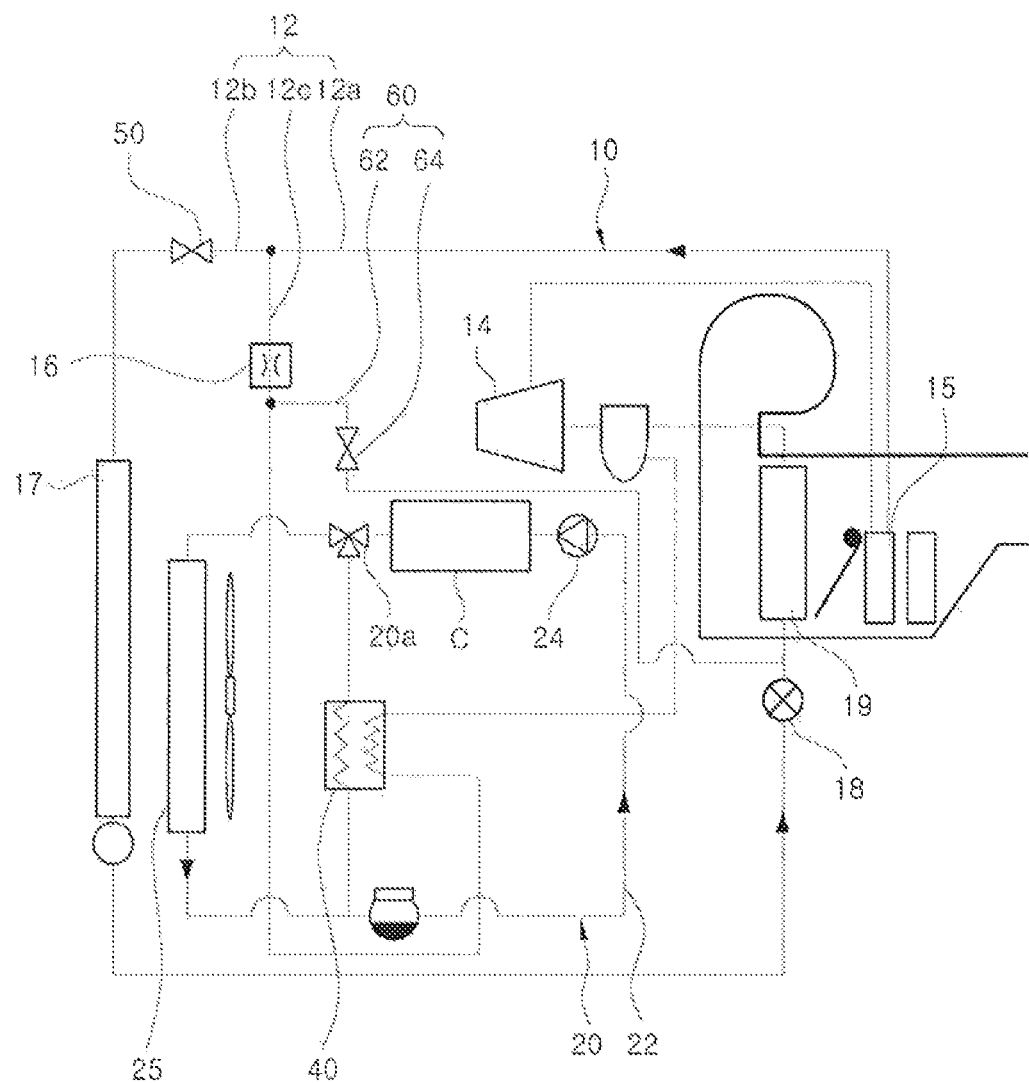
FIG. 12 is a detailed view showing a vehicular heat management system according to a third embodiment of the present invention.

Next, a vehicular heat management system according to a third embodiment of the present invention will be described with reference to FIG. 12.

The heat management system according to the third embodiment has substantially the same structure as the heat management system of the second embodiment described above.

The heat management system according to the third embodiment includes a flow control valve 50 configured to introduce the refrigerant in the main line 12a into the air conditioning mode branch line 12b or the heat pump mode branch line 12c. The flow control valve 50 is a two-way control valve and is installed in the air conditioning mode branch line 12b.

In the air conditioning mode, the flow control valve 50 having such a structure opens the air conditioning mode branch line 12b so that the refrigerant in the main line 12a can be introduced into the air conditioning mode branch line 12b.

Accordingly, in the air conditioning mode, the main line 12a and the air conditioning mode branch line 12b can form a cooling loop to cool the passenger compartment.

In the heat pump mode, the air conditioning mode branch line 12b is shut off. Thus, the refrigerant in the main line 12a can be introduced into the heat pump mode branch line 12c.

Thus, in the air conditioning mode, the main line 12a and the heat pump mode branch line 12c can form a heating loop to heat the passenger compartment.

The air conditioning system 10 adopts the flow control valve 50 having a two-way control structure and can selectively introduce the refrigerant in the main line 12a into the air conditioning mode branch line 12b or the heat pump mode branch line 12c. Therefore, as compared with the above-described embodiments in which the three-way flow control valve 50 is employed, it is possible to reduce the cost.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system, comprising:
   a refrigerant circulation line including a compressor, a high pressure side indoor heat exchanger, a heat pump mode expansion valve, an outdoor heat exchanger, an air conditioning mode expansion valve, a low pressure side indoor heat exchanger and a refrigerant-cooling water heat exchanger;
   an air conditioning mode branch line branched from the refrigerant circulation line and configured to, in an air conditioning mode, form a cooling loop by circulating a refrigerant through the compressor, the high pressure side indoor heat exchanger, the outdoor heat exchanger, the air conditioning mode expansion valve and the low pressure side indoor heat exchanger; and
   a heat pump mode branch line branched from the refrigerant circulation line and configured to, in a heat pump mode, form a heating loop by circulating the refrigerant through the compressor, the high pressure side indoor heat exchanger, the heat pump mode expansion valve and the refrigerant-cooling water heat exchanger,
   wherein the air conditioning mode branch line and the heat pump mode branch line are separate and independent from each other from a branch point in the refrigerant circulation line to the compressor so that the cooling loop and the heating loop are separated from each other from the branch point in the refrigerant circulation line to the compressor.

2. The heat management system of claim 1, wherein the heat pump mode expansion valve is configured to pass the refrigerant on the side of the high pressure side indoor heat exchanger without changing a pressure in the air conditioning mode and to depressurize and expand the refrigerant on the side of the high pressure side indoor heat exchanger in the heat pump mode, and
   the air conditioning mode branch line and the heat pump mode branch line are branched from the refrigerant circulation line on the downstream side of the heat pump mode expansion valve.

3. The heat management system of claim 1, wherein the heat pump mode expansion valve is installed on the heat pump mode branch line so as to depressurize and expand the refrigerant on the side of the high pressure side indoor heat exchanger only in the heat pump mode.

4. The heat management system of claim 3, wherein the heat pump mode expansion valve is installed in the heat pump mode branch line between a branch point, at which the heat pump mode branch line is branched from the air conditioning mode branch line, and the refrigerant-cooling water heat exchanger.

5. The heat management system of claim 1, further comprising:
   a flow control valve configured to introduce the refrigerant in the refrigerant circulation line into the air conditioning mode branch line in the air conditioning mode and to introduce the refrigerant in the refrigerant circulation line into the heat pump mode branch line in the heat pump mode.

6. The heat management system of claim 5, wherein the flow control valve is a three-way valve installed at a branch point of the air conditioning mode branch line and the heat pump mode branch line.

7. The heat management system of claim 5, wherein the flow control valve is a two-way valve installed on the air conditioning mode branch line, and
   the flow control valve is configured to allow the refrigerant in the compressor to be introduced into the air conditioning mode branch line when the air conditioning mode branch line is opened, and to allow the refrigerant in the compressor to be introduced into the heat pump mode branch line when the air conditioning mode branch line is closed.

8. The heat management system of claim 1, further comprising:
   a dehumidifying unit configured to dehumidify an air present in a passenger compartment in the heat pump mode.

9. The heat management system of claim 8, wherein the dehumidifying unit includes: a bypass line configured to bypass a low temperature refrigerant passed through the heat pump mode expansion valve and to introduce the low temperature refrigerant into the low pressure side indoor heat exchanger installed on the side of the passenger compartment; and an on-off valve configured to automatically or manually open the bypass line in the heat pump mode so that the low temperature refrigerant passed through the heat pump mode expansion valve is introduced into the low pressure side indoor heat exchanger so as to remove ambient moisture.

10. The heat management system of claim 8, wherein the dehumidifying unit includes: a bypass line configured to bypass a high pressure refrigerant before being introduced into the heat pump mode expansion valve and to introduce the high pressure refrigerant into the low pressure side indoor heat exchanger installed on the side of the passenger compartment; and a dehumidifying expansion valve configured to, in the heat pump mode, depressurize and expand the high pressure refrigerant bypassed to the bypass line into a low-temperature low-pressure refrigerant in response to a control signal and to introduce the low-temperature low-pressure refrigerant into the low pressure side indoor heat exchanger.

11. The heat management system of claim 10, wherein the dehumidifying expansion valve is a variable solenoid valve in which an opening degree of a throttle flow path is variably controlled depending on the magnitude of an applied voltage, and the dehumidifying expansion valve is configured to variably control a depressurization/expansion amount of the refrigerant introduced into the low pressure side indoor heat exchanger and to variably control a temperature of the low pressure side indoor heat exchanger.

12. The heat management system of claim 1, wherein in the air conditioning mode, the refrigerant on the side of the compressor is introduced into the outdoor heat exchanger through the air conditioning mode branch line to exchange heat with the outdoor heat exchanger; and in the heat pump mode, the refrigerant on the side of the compressor is introduced into the refrigerant-cooling water heat exchanger through the heat pump mode branch line to exchange heat with the refrigerant-cooling water heat exchanger.

13. The heat management system of claim 12, wherein the refrigerant passed through the outdoor heat exchanger is introduced into the compressor through the air conditioning mode expansion valve and the low pressure side indoor heat exchanger, and the refrigerant passed through the refrigerant-cooling water heat exchanger is merged with the refrigerant discharged from the low pressure side indoor heat exchanger and is introduced into the compressor.

14. The heat management system of claim 1, further comprising:

a cooling water circulation line configured to circulate cooling water to cool an electric component module, wherein the refrigerant-cooling water heat exchanger is configured to, in the heat pump mode, cause the refrigerant passed through the heat pump mode expansion valve and remaining in the heat pump mode branch line to exchange heat with the cooling water present in the cooling water circulation line.

* * * * *